United States Patent Office 2,848,490
Patented Aug. 19, 1958

2,848,490

PROCESS FOR PREPARING DICARBOXYLIC ACIDS FROM OZONIDES OF CYCLOOLEFINS

Karl Friedrich Johannes Niebling and Gottfried Ernst Rumscheidt, Amsterdam, Netherlands, assignors to Shell Development Company, New York, N. Y., a corporation of Delaware No Drawing. Application October 25, 1955
Serial No. 542,754

Claims priority, application Netherlands October 29, 1954

11 Claims. (Cl. 260—537)

This invention relates to a process for the preparation of aliphatic polycarboxylic acids. More particularly, this invention provides a process for preparing aliphatic polycarboxylic acids by the single stage combined hydrolysis and oxidation of ozonides of cyclic olefins.

It is known in the art that olefinically unsaturated cyclic hydrocarbons will react with ozone. The products of this reaction, or ozonides, range from compounds having a relatively simple structure to compounds having a highly complex structure. The simple products of the reaction, or monomers, are referred to as ozonides. Their structure is believed to conform to one or the other of the two formulas:

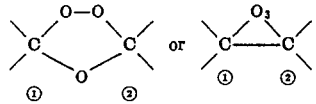

The more complex ozonides are polymeric in nature. Their structure has not been fully ascertained. They can be referred to simply as polymeric ozonides. The term "ozonide" will be used herein to include both the monomeric and polymeric reaction products of ozone with olefinically unsaturated cyclic hydrocarbons.

It has now been discovered that this ozonide linkage can be broken to form two carboxyl groups and these ozonides converted to the corresponding polycarboxylic acids in excellent yields by reacting the ozonide with molecular oxygen in the presence of water and an oxidation catalyst, the reaction being carried out in the liquid phase at moderately elevated temperatures. This discovery provides the basis for a practical process for preparing aliphatic polycarboxylic acids from the ozonides of widely available olefinically unsaturated cyclic hydrocarbons.

Ozonides of olefinically unsaturated cyclic hydrocarbons are a well known class of compounds, usually prepared in substantially quantitative yields by passing an ozone containing gas (normally a mixture of oxygen and ozone) into the olefin, preferably in admixture with an anhydrous diluent liquid which is a solvent for the ozonide product. The ozonization is carried out at reaction temperatures within the range of from about $-40°$ C. to about $+35°$ C. Since the ozonide product is often subject to attack by ozone, precautions are normally taken to prevent addition of ozone after the desired reaction has gone to substantial completion. The method is exemplified in the article by Henne et al., J. Am. Chem. Soc., 65, 2183–5 (1943), and is also described in the patent to Knobloch et al., (U. S. 2,665,280).

As has heretofore been stated, there is at present some disagreement as to the precise structure to be assigned to the reaction products of ozone with olefinically unsaturated cyclic hydrocarbons, especially the polymeric products thereof. In view of these difficulties, and for convenience in designation and definition of the ozonide reactant, the ozone-olefin reaction products will be referred to herein as "ozonides" or as "the ozonide of (particular olefin or class of olefins)." The ozonide reactants will thus be defined in terms of the olefins from which they were derived. Support for the use of such terminology appears throughout the summary of the ozonolysis art given by Louis Long, Jr. (Chemical Reviews, 27, 437–493 (1940)), and especially in the introductory portions thereof, and further in such patents as that issued to Foster et al. (U. S. 2,657,240, issued October 27, 1953).

As the ozonide reactant, there may be used the ozonide of any olefinically unsaturated cyclic hydrocarbon or mixtures of such ozonides wherein the olefinically unsaturated carbon atoms are unsubstituted. Preferred members of the class of olefins from which these ozonides are formed are the mono- and poly-olefinically unsaturated cycloalkanes, either unsubstituted or substituted by atoms or groups which are substantially inert and which do not interfere with the formation of the ozonide. In all cases, it is essential that the olefinically unsaturated carbon atoms be unsubstituted—i. e., in each of the olefinically unsaturated carbon atoms, the non-olefinic valence bond not linked to a carbon atom must be linked to a hydrogen atom. Examples of suitable ozonides include the ozonides of such cycloalkenes as cyclobutene, cyclopentene, cyclohexene, cyclooctene, cyclododecene, cyclopentadecene, cyclononadecene, cyclotetracosene, cyclotriacontene and the like. It is preferred that the ozonide contain not more than about 30 carbon atoms. For many applications, the aliphatic dicarboxylic acids wherein the carboxyl groups are each on a terminal carbon atom of the chain—i. e., the alpha, omega-dicarboxylic acids—are most useful. These acids are prepared from ozonides of unsubstituted cycloolefins or substituted cycloolefins wherein the substituent group or groups is (are) linked to carbon atoms other than the carbon atoms immediately adjacent to the olefinically unsaturated carbon atoms. For other purposes, it is desirable that the carboxyl groups not be linked to terminal carbon atoms of the chain; in such cases, the cyclo-olefin used is substituted on the carbon atom or atoms immediately adjacent to the olefinically unsaturated carbon atoms by one or more hydrocarbon groups.

The ozonides of the polyunsaturated cyclic hydrocarbons also are satisfactory as the starting material. For example, there can be used the ozonides of 2,4-cyclopentadiene, 2,5-cyclohexadiene, 3,6-cyclooctadiene, 3,6-cyclododecadiene, 2,5,6-cyclooctatriene and the like and their isomers in which the olefinic unsaturation is located at different positions in the ring than those indicated. Ozonides of condensed poly-ring systems containing one or more olefinic linkages also are satisfactory, as are multiple ring systems linked together by aliphatic linkages. It should be noted that when ozonides are treated according to the process of this invention, scission of the ozonide linkage occurs, so that where more than one olefinic linkage exists, the dicarboxylic acid products do not contain the same number of carbon atoms as the ozonide reactant. The number of carbon atoms in each acid product is, of course, determined by the position of the olefinic linkages in the cyclic olefin from which the ozonide was found. By proper choice of the ozonide, various kinds of dicarboxylic acid products are possible. For still other purposes, aliphatic polycarboxylic acids containing more than two carboxyl groups are most useful; these may be prepared by using a cycloalkene carboxylic acid for the starting material. Thus, 1-cyclohexene-3-carboxylic acid can be used to prepare 1,1,4-butanetricarboxylic acid and 1-cyclohexene-3,5-dicarboxylic acid can be used to prepare 1,1,3,4-butanetetracarboxylic acid. Acids containing more than two carboxyl groups can also be made from such compounds as the ozonide of 1,2 - dicyclohexenyl-ethane which when treated according to the process of the invention gives the tetracarboxylic acid, 3,6 - di(carboxymethyl)octane - 1,8 - dioic acid. By proper choice of substituent groups, the desired configuration of the polycarboxylic acids can be obtained.

Mixtures of ozonides also are quite suitable as the starting material. Further, the crude product of the ozonization of one or more cyclic olefins may be used directly in the new process without the necessity for separating out the pure ozonide. By proceeding according to the new process, the danger of explosive decomposition of various side reaction products normally present in the crude mixture resulting from the ozonization of the cycloolefins is substantially precluded.

The conversion of the ozonide to the polycarboxylic acid is effected by treating the ozonide simultaneously with water and molecular oxygen in the liquid phase in the presence of an oxidation catalyst and at a moderately elevated temperature.

The ozonide may be used directly, as is set out above, but often the ozonide is rather insoluble in water, so that it is often advantageous to dissolve the ozonide in a suitable inert organic solvent and treat the solution with water and oxygen according to this new process. Preferably, the solvent is one miscible with or soluble in water, so that a homogeneous reaction mixture is obtained. Solvents such as the esters of lower alcohols with lower aliphatic monocarboxylic acids, for example, methyl and ethyl acetate, methyl propionate and the like, have been found most suitable, however, any of the solvents normally used in the preparation of ozonides may be employed.

The amount of solvent used should be at least sufficient to dissolve all of the ozonide reactant to give a readily fluid solution; a moderate excess over the amount required just to dissolve the ozonide—up to about 10 to 20 times the minimum may be desirable to insure a readily fluid solution. Depending upon the particular solvent chosen, the amount thereof preferably does not exceed that amount which is completely miscible with or soluble in the amount of water used.

The amount of water present in the reaction zone must be at least that amount theoretically required to completely react with the ozonide. A moderate to large excess over this amount is normally used to provide a suitable reaction mixture volume and to dissolve any organic solvent used—so as to provide a homogeneous reaction medium. From the standpoint of the desired reaction itself, no maximum limit on the amount of water exists; the amount of water used will primarily be determined by the convenience of the operator.

As the source of molecular oxygen, any convenient supply may be used. Air is quite suitable; however, in some cases it may be desirable to use pure oxygen, commercial (95%) oxygen or oxygen enriched air.

The reaction is catalyzed by an oxidation catalyst. By this is meant any compound ordinarily considered to promote the attack of molecular oxygen upon an organic compound. In general, compounds of the heavy polyvalent metals are considered the most suitable in this purpose. By the term heavy polyvalent metals are meant the polyvalent metals having an atomic number of from about 23 to about 82. The salts, or other compounds or complexes of cerium, cobalt, manganese, nickel, vanadium and chromium all are suitable as the catalyst, specific examples of this class of compounds being the oxides of nickel, chromium, and cobalt, their chlorides, nitrates or sulfates, salts of such metals as iron (ferric), cobalt zinc, bismuth, manganese, cobalt and copper with organic acids, such as acetic acid, propionic acid, butyric acid and naphthenic acids. Also suitable are compounds in which such metals appear as a part of the anion, especially where oxygen forms another part of the anion, for example, the permanganate ion, chromate ion and the like. The amount of catalyst used need be very small, a concentration of catalyst in the reaction mixture of about 10%, based upon the weight of ozonide charged generally being on economic maximum. In most cases, the amount of catalyst employed need be but from about 100 p. p. m. (0.01%) to about 1.0% by weight of the ozonide used.

The reaction is carried out by mixing the ozonide (or solution thereof) with the catalyst and the water, heating the mixture and passing the molecular oxygen containing gas through the mixture until substantially all of the ozonide has been decomposed. The reaction is carried out in the liquid phase, normally at atmospheric pressure, although superatmospheric or subatmospheric pressures may be used to advantage in some cases.

By "moderately elevated temperatures" is meant any temperature above about 40° C. (preferably above 60° C.) and up to the boiling point of the liquid mixture. At temperatures below this range, the reaction goes forward at reduced rates. The use of temperatures within the range of from about 40° C. to about 150° C. is preferred. The organic solvent, if such be used, is normally removed at or near the end of the reaction period. The reaction is often most conveniently carried out by conducting it at the boiling point of the mixture, toward the end of the reaction period, allowing the organic solvent to distill from the mixture.

The rate at which the molecular oxygen is passed into the reaction mixture is not critical, provided sufficient oxygen is provided to allow the reaction to go forward. While it is preferred that the flow of molecular oxygen into the mixture be substantially constant, the amount thereof can fluctuate to some extent, or even cease temporarily without seriously affecting the direction and/or extent of the desired reaction.

The polycarboxylic acid product normally is obtained by crystallization from the crude aqueous product.

Where the crude product of the ozonolysis of cyclic olefins is used as the source of the ozonide reactant it has been found essential to the efficient conduct of the reaction that the reaction mixture be maintained in a neutral state, for if the mixture becomes even slightly acid, the danger of explosive decomposition of side-reaction products of the ozonization reaction contained in the crude ozonide is greatly increased. Normally, the reaction mixture is essentially neutral if the process is carried out as set out hereinbefore and no special measures need be taken to insure a neutral system.

The invention is illustrated by means of the following examples:

*Example I*

Ozone was introduced into a solution of 1.8 parts by weight of cyclohexene in 57 parts by weight of ethyl acetate until the amount of ozone theoretically required to form the ozonide of cyclohexene had been added, the mixture being kept at 0° C. throughout the addition of the ozone. 0.01% by weight, based upon the amount of cyclohexene ozonide of potassium permanganate was added to act as catalyst, an excess of water, based on the amount of ozonide, was added, the whole mixture was heated to 100° C. and oxygen passed through the system. The ethyl acetate solvent was distilled off during the last stages of the reaction. 3 parts by weight of adipic acid, representing a yield of 65 mole percent, based on the cyclohexene, crystallized from the remaining aqueous solution.

*Example II*

The procedure of Example I was repeated, substituting for the cyclohexene an equivalent amount of cyclopentene. A yield of 60 mole percent, based on the cyclopentene charged, of glutaric acid was obtained.

*Example III*

2-methyl-1,4-butanedicarboxylic acid is prepared by dissolving the ozonide of 4-methylcyclohexene in 25 times its weight of ethyl acetate, adding 0.1% of the weight of the 4-methylcyclohexene ozonide of cobalt oxide as catalyst and an excess of water and passing oxygen through the mixture which is held at about 100° C.

*Example IV*

By substituting an equivalent amount of cyclo-octadiene for the cyclohexene of Example I, a high yield of succinic acid is prepared.

We claim as our invention:

1. A process for the production of aliphatic dicarboxylic acids which comprises reacting an ozonide of a cyclic olefin of up to 30 carbon atoms in which each of the olefinically unsaturated carbon atoms is bonded to each of two other carbon atoms of the ring and to a hydrogen atom, with molecular oxygen in the presence of water and at least one polyvalent metal compound wherein the metal has an atomic number of from about 23 to about 82 as catalyst, said reaction being carried out in liquid phase under neutral conditions at a temperature above about 40° C.

2. A process for the production of aliphatic alpha,-omega-dicarboxylic acids which comprises reacting an ozonide of a cyclic olefin of up to 30 carbon atoms in which each of the olefinically unsaturated carbon atoms and each of the carbon atoms directly linked to said unsaturated carbon atoms is bonded only to each of two other carbon atoms of the ring and to hydrogen, with molecular oxygen in the presence of an amount of water in excess of the amount of water theoretically required to hydrolyze the said ozonide, and at least one polyvalent metal compound wherein the metal has an atomic number of from about 23 to about 82 as catalyst, said reaction being conducted in liquid phase under neutral conditions at a temperature above about 40° C.

3. A process for the production of aliphatic dicarboxylic acids which comprises reacting a solution of an ozonide of a cyclic olefin of up to 30 carbon atoms in which each of the olefinically unsaturated carbon atoms is bonded to each of two other carbon atoms of the ring and to a hydrogen atom, in a neutral inert organic solvent with molecular oxygen in the presence of an amount of water in excess of the amount of water theoretically required to completely hydrolyze the said ozonide and at least one polyvalent metal compound in which the metal has an atomic number of from about 23 to about 82 as catalyst, said reaction being conducted in liquid phase under neutral conditions at a temperature of from about 40° C. to the temperature at which the resulting reaction mixture boils.

4. The process according to claim 3 wherein the solution of the ozonide is the crude reaction mixture obtained by the ozonization of the cyclic olefin in said solvent under neutral conditions.

5. A process for the production of aliphatic dicarboxylic acids which comprises reacting a solution of an ozonide of a cycloalkene of up to 30 carbon atoms in which each of the olefinically unsaturated carbon atoms is bonded to each of two other carbon atoms of the ring and to a hydrogen atom, in an ester of a lower aliphatic monocarboxylic acid with molecular oxygen in the presence of an amount of water in excess of the amount of water theoretically required to completely hydrolyze the said ozonide and at least one polyvalent metal compound in which the metal has an atomic number of from about 23 to about 82 as catalyst, said reaction being conducted in liquid phase under neutral conditions at a temperature of from about 40° C. to about 150° C.

6. The process according to claim 5 wherein the said oxidation catalyst is a compound in which the said polyvalent metal, in combination with oxygen, forms the anion.

7. The process according to claim 6 wherein the polyvalent metal is manganese.

8. In a process wherein a cyclic olefin of up to 30 carbon atoms in which each of the olefinically unsaturated carbon atoms is bonded to each of two other carbon atoms of the ring and to a hydrogen atom, is reacted with ozone under non-acidic conditions to form the ozonide of said olefin and the said ozonide is oxidatively hydrolyzed to the corresponding aliphatic dicarboxylic acid, the improvement which comprises conducting the oxidative hydrolysis of the ozonide by reacting the crude ozonide product of the ozonization with molecular oxygen in the presence of water and at least one polyvalent metal compound wherein the metal has an atomic number of from about 23 to about 82 as catalyst, said reaction being carried out in liquid phase under neutral conditions at a temperature above about 40° C.

9. In a process wherein a cyclic olefin of up to 30 carbon atoms in which each of the olefinically unsaturated carbon atoms is bonded to each of two other carbon atoms of the ring and to a hydrogen atom, is reacted with ozone under neutral conditions and in the presence of a neutral inert organic solvent to form the ozonide of said olefin and the said ozonide is oxidatively hydrolyzed to the corresponding aliphatic dicarboxylic acid, the improvement which comprises conducting the oxidative hydrolysis of the ozonide by reacting the solution of the crude ozonide product of the ozonization with molecular oxygen in the presence of water and at least one polyvalent metal compound wherein the metal has an atomic number of from about 23 to about 82 as catalyst, said reaction being carried out in liquid phase under neutral conditions at a temperature above about 40° C.

10. In a process wherein a cycloalkene of up to 30 carbon atoms in which each of the olefinically unsaturated carbon atoms is bonded to each of two other carbon atoms of the ring and to a hydrogen atom, is reacted with ozone under neutral conditions and in the presence of an ester of a lower aliphatic monocarboxylic acid as solvent to form the ozonide of said olefin and the said ozonide is oxidatively hydrolyzed to the corresponding aliphatic dicarboxylic acid, the improvement which comprises conducting the oxidative hydrolysis of the ozonide by reacting the solution of the crude ozonide product of the ozonization with molecular oxygen in the presence of an amount of water in excess of the amount of water theoretically required to completely hydrolyze the said ozonide and at least one polyvalent metal compound in which the metal has an atomic number of from about 23 to about 82 as catalyst, said reaction being conducted in liquid phase under neutral conditions at a temperature of from about 40° C. to about 150° C.

11. A process for preparing adipic acid which comprises reacting a solution of the ozonide of cyclohexene in ethyl acetate with molecular oxygen at a temperature of about 100° C. in the presence of potassium permanganate as catalyst, under neutral conditions and in the presence of water in an amount in excess of the theoretical amount of water required to hydrolyze said ozonide.

References Cited in the file of this patent

FOREIGN PATENTS 868,148  Germany _____ Feb. 23, 1953

OTHER REFERENCES

Long: Chemical Reviews, vol. 27 (1940), pp. 452, 437, 441.

Henne et al.: Jour. Amer. Chem. Soc., vol. 65 (1943), pp. 752–54.

Wilms: Liebigs Annalen Chemie, Band 567 (1950), pp. 96–99.